(12) United States Patent
Sweeney

(10) Patent No.: US 11,135,959 B2
(45) Date of Patent: Oct. 5, 2021

(54) DUMP TRAILER

(71) Applicant: Al's Complete Lawn Care, LLC, Lexington, KY (US)

(72) Inventor: Allen Sweeney, Frankfort, KY (US)

(73) Assignee: Al's Complete Lawn Care, LLC, Lexington, KY (US)

( * ) Notice: Subject to any disclaimer, the term of this patent is extended or adjusted under 35 U.S.C. 154(b) by 249 days.

(21) Appl. No.: 16/535,156

(22) Filed: Aug. 8, 2019

(65) Prior Publication Data
US 2020/0391643 A1 Dec. 17, 2020

Related U.S. Application Data

(60) Provisional application No. 62/861,395, filed on Jun. 14, 2019.

(51) Int. Cl.
*B60P 1/28* (2006.01)
*B60P 1/16* (2006.01)

(52) U.S. Cl.
CPC .. *B60P 1/28* (2013.01); *B60P 1/16* (2013.01)

(58) Field of Classification Search
CPC .... B60P 1/28; B60P 1/16; B60P 1/283; B60P 1/04
USPC ............... 298/5, 6, 8 T, 22 R, 22 P, 17 T, 38
See application file for complete search history.

(56) References Cited

U.S. PATENT DOCUMENTS

| | | | |
|---|---|---|---|
| 3,447,834 A * | 6/1969 | Grosse-Rhode | B60P 1/283 298/5 |
| D231,825 S | 6/1974 | Daubert | |
| D237,064 S * | 10/1975 | Whitney | D12/105 |
| 4,218,226 A * | 8/1980 | Boozer | B01D 45/00 15/323 |
| 4,227,893 A * | 10/1980 | Shaddock | B60P 1/60 15/340.1 |
| D295,271 S | 4/1988 | Anderson | |
| D296,455 S * | 6/1988 | Lautt | D21/558 |
| 5,544,944 A * | 8/1996 | Keech | B60P 1/24 298/5 |
| D386,722 S | 11/1997 | Dunphy | |
| 5,887,880 A | 3/1999 | Mullican et al. | |
| 6,082,631 A | 7/2000 | Aslakson | |
| D431,498 S | 10/2000 | Smith et al. | |
| D445,067 S | 7/2001 | Musso, Jr. et al. | |
| 6,398,140 B1 | 6/2002 | Stieh et al. | |
| 7,111,908 B1 * | 9/2006 | Mills | B60P 1/28 298/22 R |
| 9,308,853 B2 | 4/2016 | Raemsch | |

(Continued)

*Primary Examiner* — Stephen T Gordon
(74) *Attorney, Agent, or Firm* — Wood Herron & Evans LLP

(57) ABSTRACT

A dump trailer comprises a frame that is supported by at least one axle coupled to two wheels. The dump trailer includes a hitch operatively coupled to the frame and is configured to be attached to a tow vehicle. The dump trailer further includes a dump box pivotably coupled to the frame. The dump box has a front wall and is moveable between a lowered position and a raised position. The dump trailer also includes a storage unit supported by the frame and positioned adjacent to the front wall when the dump box is in the lowered position. The storage unit has at least one door and an interior configured to store items placed therein. The door is openable and the interior of the storage unit is accessible when the dump box is in either the lowered position or the raised position.

13 Claims, 6 Drawing Sheets

(56) References Cited

U.S. PATENT DOCUMENTS

| | | |
|---|---|---|
| D773,958 S | 12/2016 | Rike |
| D840,267 S | 2/2019 | Rike |
| 2015/0224906 A1 | 8/2015 | Harrison et al. |
| 2018/0215302 A1 | 8/2018 | Reid |

* cited by examiner

DUMP TRAILER

RELATED APPLICATION

The present application claims priority to U.S. Ser. No. 62/861,395 filed on Jun. 14, 2019, the disclosure of which is hereby incorporated herein by reference in its entirety.

TECHNICAL FIELD

The invention relates generally to dump trailers and, more particularly, to dump trailers with increased storage capacity.

BACKGROUND

Contractors and lawn maintenance companies use dump trailers for a wide variety of purposes. A dump trailer typically has a dump box that is pivotally mounted on a frame or chassis. An on-board hydraulic lift system is used to pivot, i.e., raise, the dump box relative to the frame so that material in the dump box can slide out of the dump box. It is a similar concept to a conventional dump truck with a dump box, but the dump trailer is pulled by a tow vehicle, such as a pickup truck for example. The dump trailer may carry material, such as fill dirt, mulch, fertilizer, gravel, road salt, etc., to a job site where it can be dumped at the job site where needed. The dump trailer may also carry material, such as demolition materials, excavated dirt, broken up concrete, landscape trimmings/material, etc., from a job site to a dump site.

Often times, a contractor or lawn maintenance worker will need tools or equipment to perform his or her job responsibilities. For instance, a job may need one or more tools or pieces of equipment, such as a shovel, mattock, rake, hoe, pick, axe, post-hole digger, chain saw, string trimmer, leaf blower, wheel barrow, garden hose, broom, etc. Tools such as these are not readily transported in a dump trailer when a load is in the dump box. Instead, such tools are typically carried by the tow vehicle such as a pickup truck. Even when the dump box is empty, there is no good way to secure the tools to the dump trailer such that they would not be subject to being stolen when the dump trailer is unattended. In addition, many contractors also perform seasonal services that require the tow vehicle to be outfitted with specialty equipment in the bed of the tow vehicle, such as a salt spreader. With a salt spreader in the bed of the tow vehicle, tools may not be carried or stored in the bed. Thus, when it comes time to install the salt spreader the tools in the bed of the tow vehicle must be removed, but, as discussed above, storing the tools in the dump trailer is not an option. Moreover, when the tow vehicle is needed for jobs other than spreading salt, the salt spreader must be removed and the tools loaded back into the bed of the tow vehicle. The installing and uninstalling of the salt spreader and unloading and loading of tools back into the bed of the tow vehicle means additional overhead expense and loss of valuable time.

What is needed, therefore, is a dump trailer that can carry tools in a secure manner when the dump box is either empty or full.

SUMMARY OF THE INVENTION

In an embodiment, a dump trailer comprises a frame that is supported by at least one axle coupled to two wheels. The dump trailer includes a hitch operatively coupled to the frame and is configured to be attached to a tow vehicle. The dump trailer further includes a dump box pivotably coupled to the frame. The dump box has a front wall and is moveable between a lowered position and a raised position. The dump trailer also includes a storage unit supported by the frame and positioned adjacent to the front wall when the dump box is in the lowered position. The storage unit has at least one door and an interior configured to store items placed therein. The door is openable and the interior of the storage unit is accessible when the dump box is in either the lowered position or the raised position. In aspect of this embodiment, the storage unit has two doors on opposing sides of the storage box, where each door is lockable. The storage unit may include a floor shelf. The storage unit may also include a secondary shelf positioned above the floor shelf. The secondary shelf may selectively moveable up or down in the interior of the storage unit. The dump trailer may further include a pump housing disposed between the hitch and the storage unit.

In one embodiment, the dump trailer further comprises a raised platform operatively couple to an upper end of the front wall of the dump box. The raised platform is configured to support at least one item placed thereon. The raised platform may extend away from the front wall and over a top surface of the storage unit.

In another embodiment, a dump trailer comprises a frame having a front end. The dump trailer includes a hitch operatively coupled to the frame and is configured to be attached to a tow vehicle. The dump trailer also includes a dump box supported by the frame. The dump box has a front wall and is moveable between a lowered position and a raised position. The dump trailer also includes a storage unit positioned on the front end of the frame and adjacent to the front wall when the dump box is in the lowered position. The storage unit has at least one door and at least one shelf located in the interior of the storage unit. The dump trailer further includes a raised platform operatively coupled to an upper end of the front wall of the dump box. The raised platform extends away from the front wall and over a top surface of the storage unit and is configured to support at least one item placed thereon. The door is openable and the interior of the storage unit is accessible when the dump box is in either the lowered position or the raised position.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION OF THE INVENTION

Figure 1:
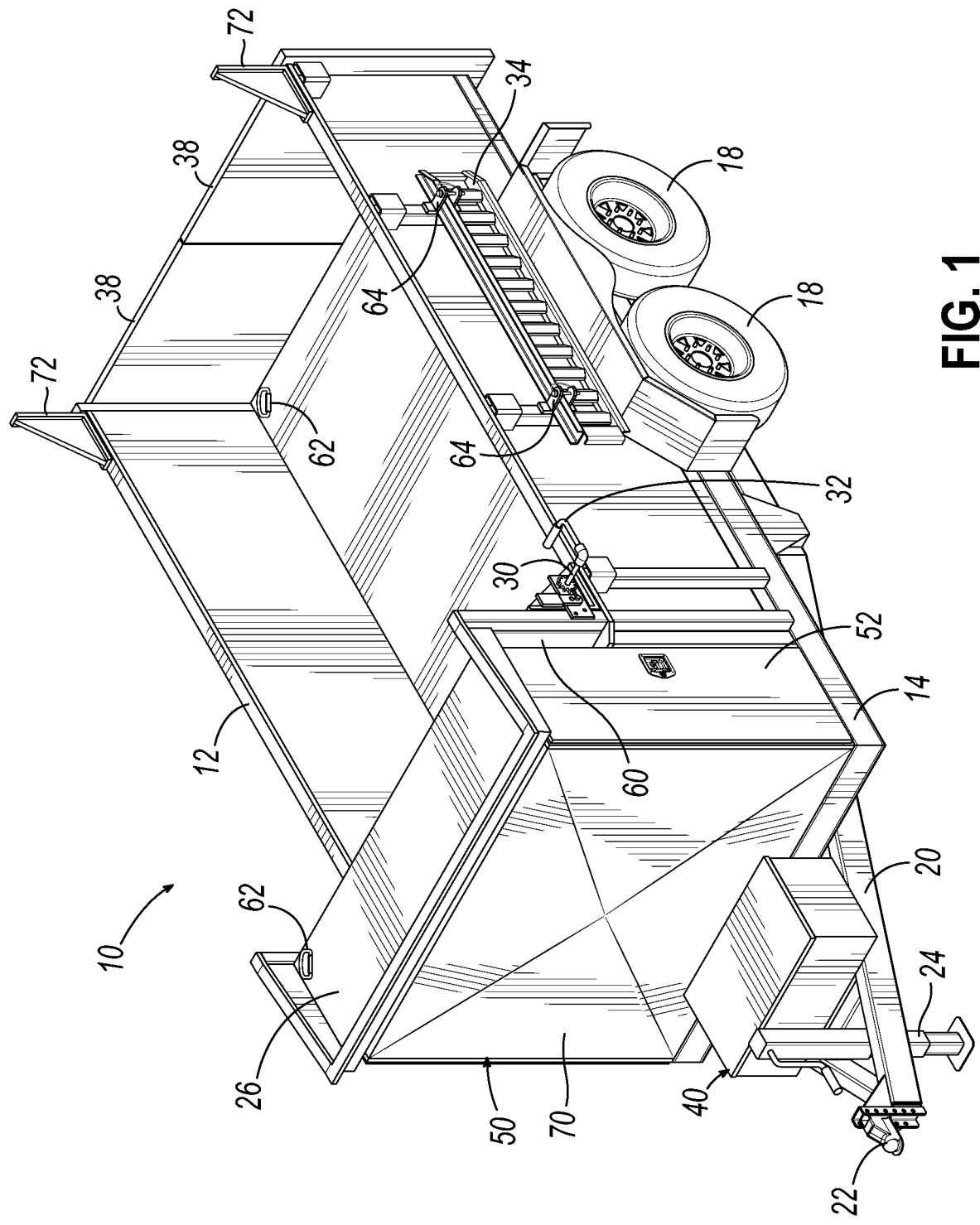
FIG. 1 is a perspective view of a dump trailer with a storage unit according to one embodiment of the invention.
Figure 2:
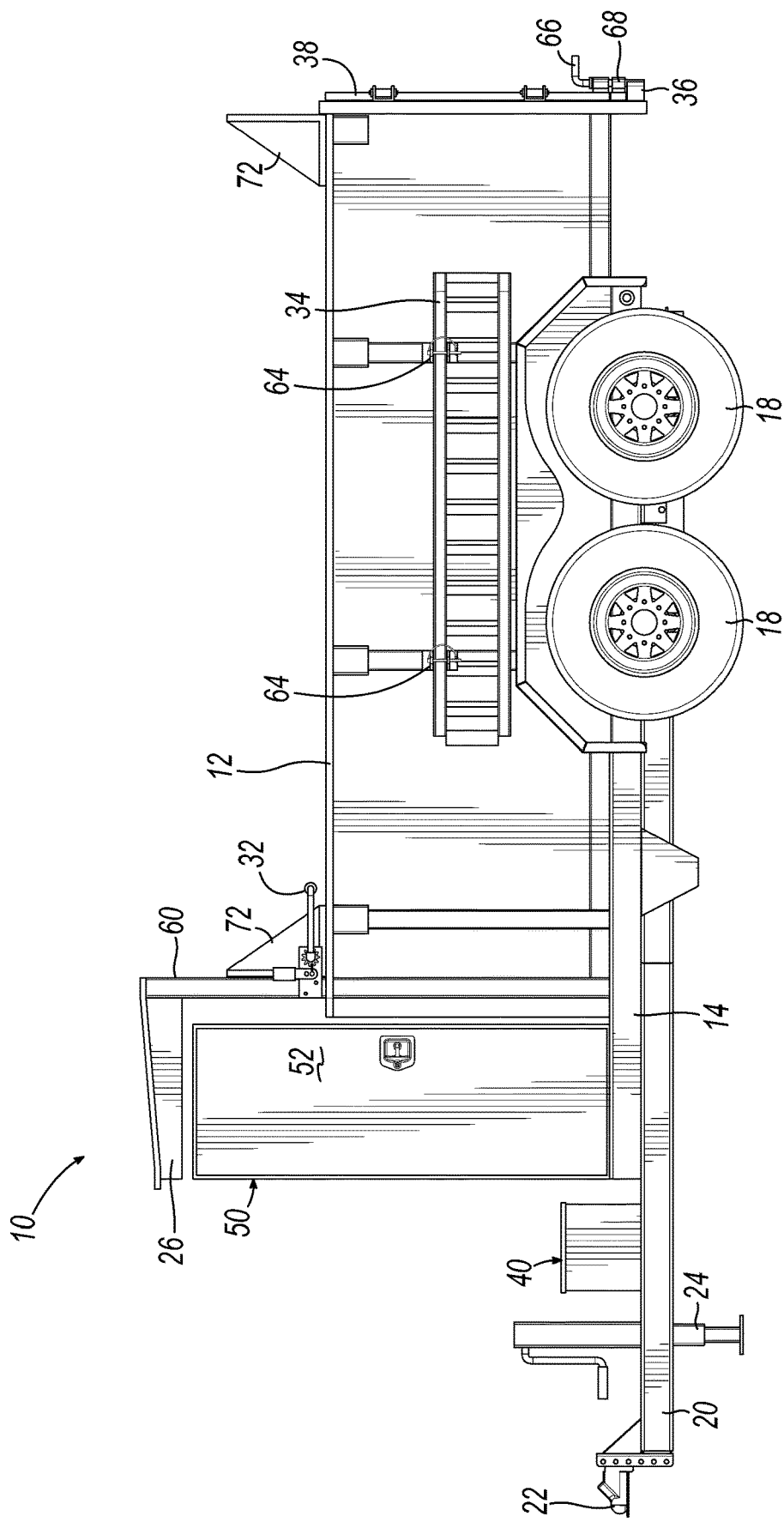
FIG. 2 is a side elevation view of the dump trailer of FIG. 1 with the dump box in the lowered position.

With reference to FIGS. 1 and 2, a dump trailer 10 according to one embodiment of the present invention is shown. The dump trailer 10 includes a dump box 12 operatively coupled to a frame or chassis 14, which is supported by a pair of axles 16 (FIG. 5) connected to tires 18. A tongue 20 is connected to the underside of the front of the chassis 14. The tongue 20 includes a trailer hitch 22, which is configured to couple to and be pulled by a tow vehicle, such as a pickup truck (not shown). A jack 24 is connected to the tongue 20 to support the tongue 20 when the dump trailer 10 is not coupled to a tow vehicle.

Figure 6:
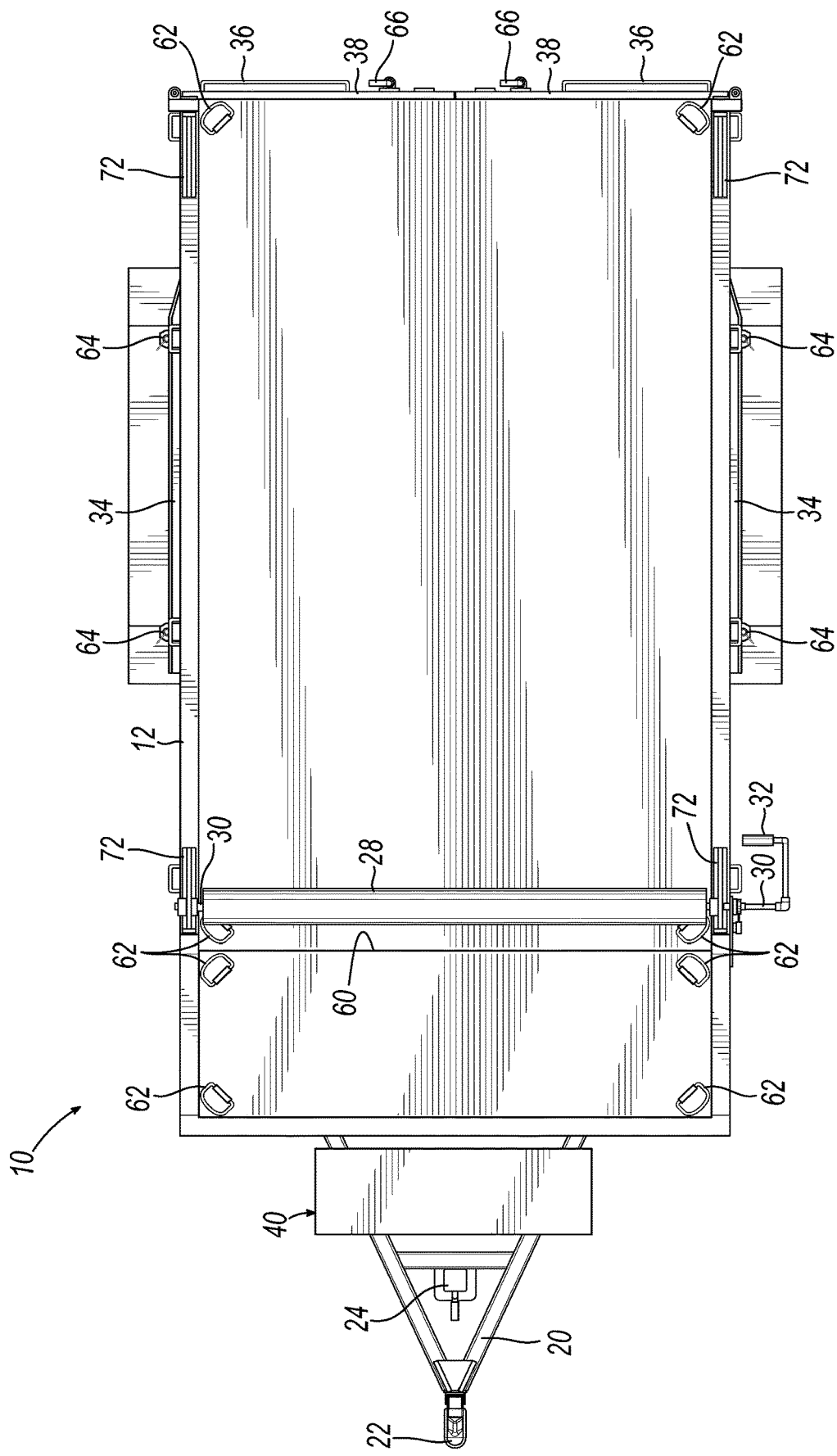
FIG. 6 is top plan view of the dump trailer of FIG. 1.

A raised platform 26 is connected to and extends away from a front wall 60 of the dump box 12. The raised platform 26 is configured to hold tools and equipment, such as a wheel barrow. The raised platform 26 may have one or more attachment members 62, such as D-rings, so that tie-down straps, ropes, chains, and the like may be secured to the attachment members 62 to help hold the tools and equipment in place on the raised platform 26. Additional attachment members (D-rings) 62 may also be affixed to the floor of the dump box 12 to help secure items placed inside the dump box 12. The dump box 12 further includes a cover or tarp 28 (FIG. 6) which is shown rolled up on a shaft 30 which may be turned by hand crank 32. The tarp 28 may be unrolled to cover a load in the dump box 12 so as to retain the load in the dump box 12 when the dump trailer 10 is pulled at high speeds, for instance.

Figure 5:
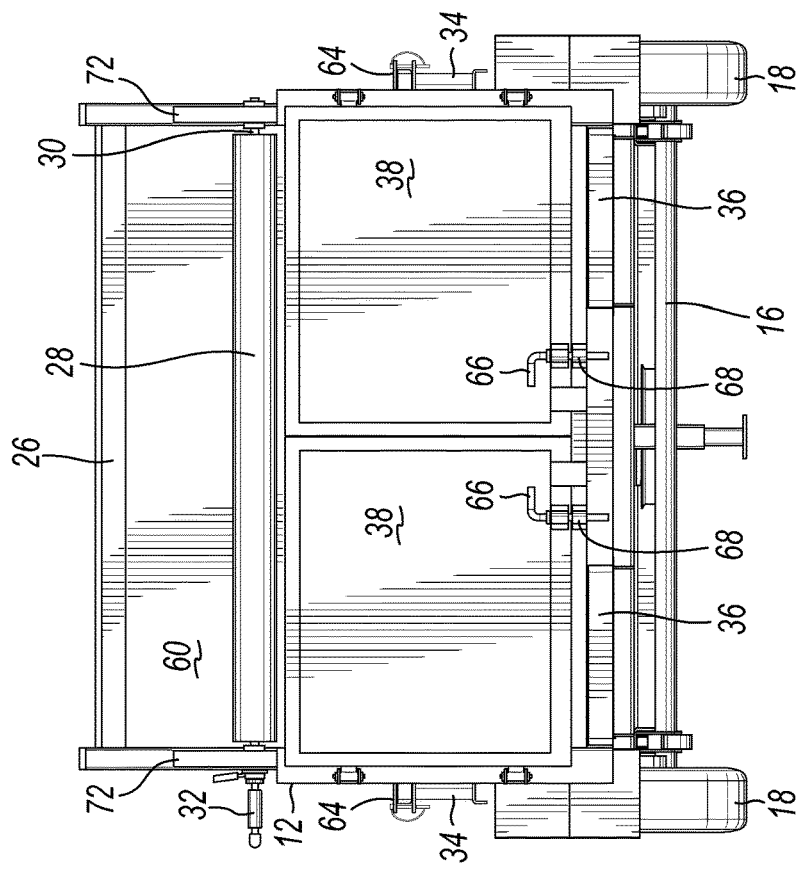
FIG. 5 is a rear elevation view of the dump trailer of FIG. 1 with the rear gates in a closed position.
Figure 4:
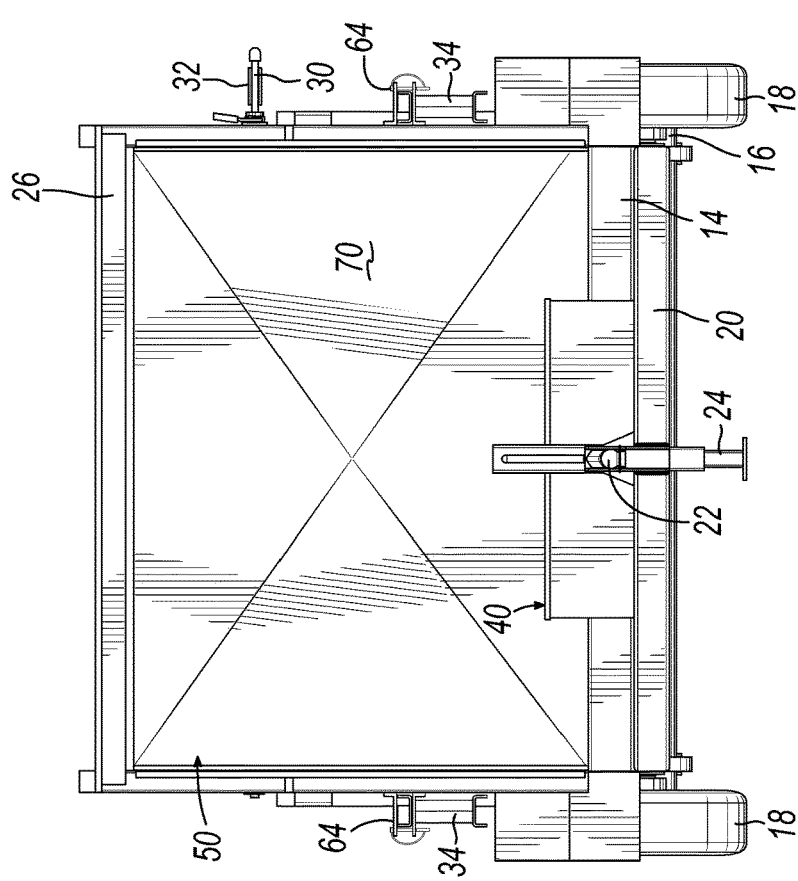
FIG. 4 is a front elevation view of the dump trailer of FIG. 1.

The dump trailer 10 includes a pair of ramps 34 removably mounted to the sides of the dump box 12 via retainers 64. The ramps 34 are configured to engage retaining fixtures 36, which hold the ramps 34 in place when equipment is loaded in and unloaded from the dump box 12. The dump box 12 includes a pair of gates or doors 38 (FIG. 5), each of which may be opened independently of the other. Each door 38 may be held in the closed position by a movable rod 66 engaging a slotted members 68 as illustrated in FIG. 5.

Figure 3:
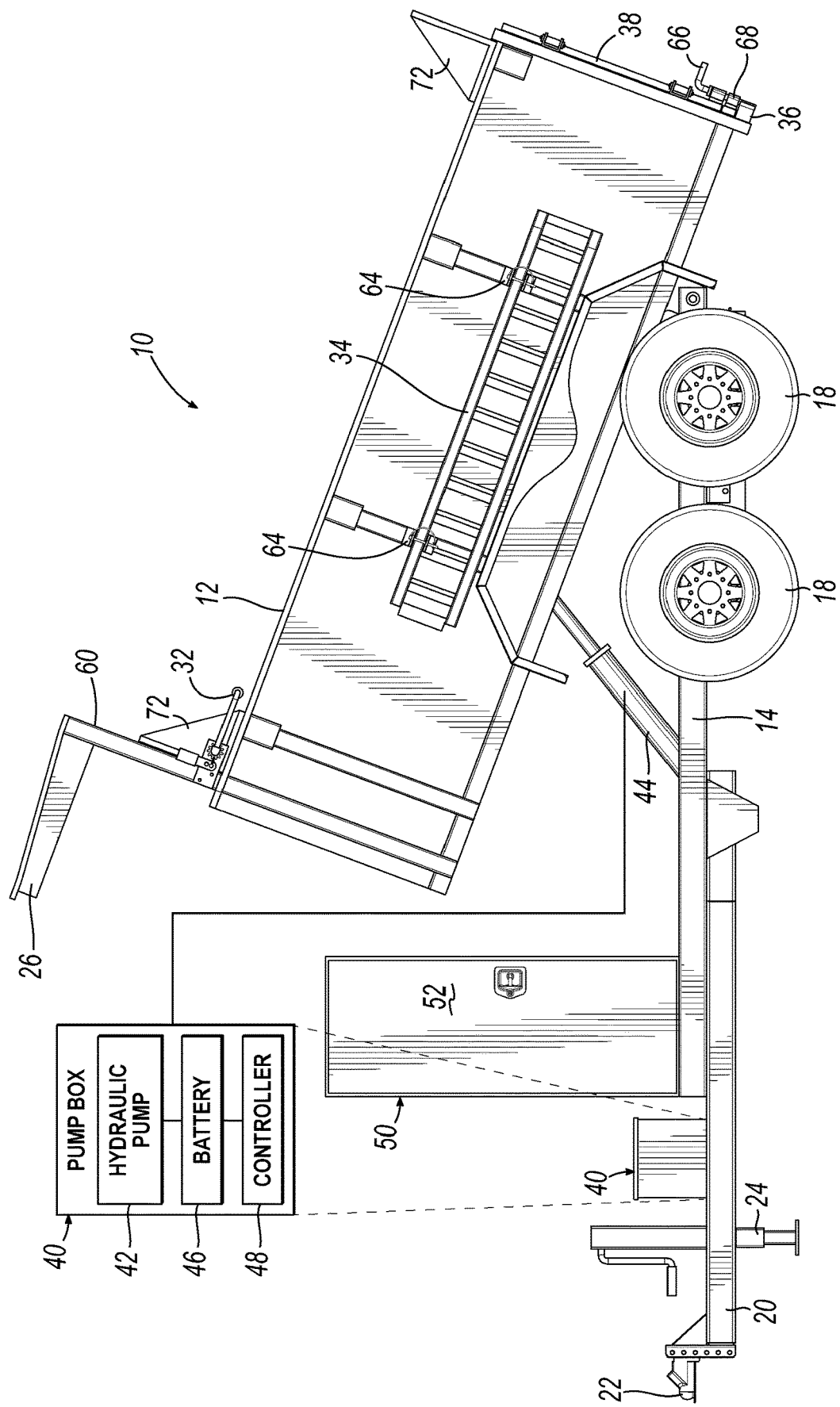
FIG. 3 is a side elevation view of the dump trailer of FIG. 1 with the dump box in a raised position.

The dump trailer 10 includes a pump housing 40 sitting atop the tongue 20 near the jack 24. As schematically illustrated in FIG. 3, the pump housing 40 includes a hydraulic pump 42 operatively connected to a hydraulic cylinder 44 which is configured to raise and lower the dump box 12. The pump housing 40 further includes a battery 46 operatively connected to the hydraulic pump 42 to supply it with power. Raising and lowering the dump box 12 is done with a hand controller 48 which controls the hydraulic pump 42.

Figure 7:
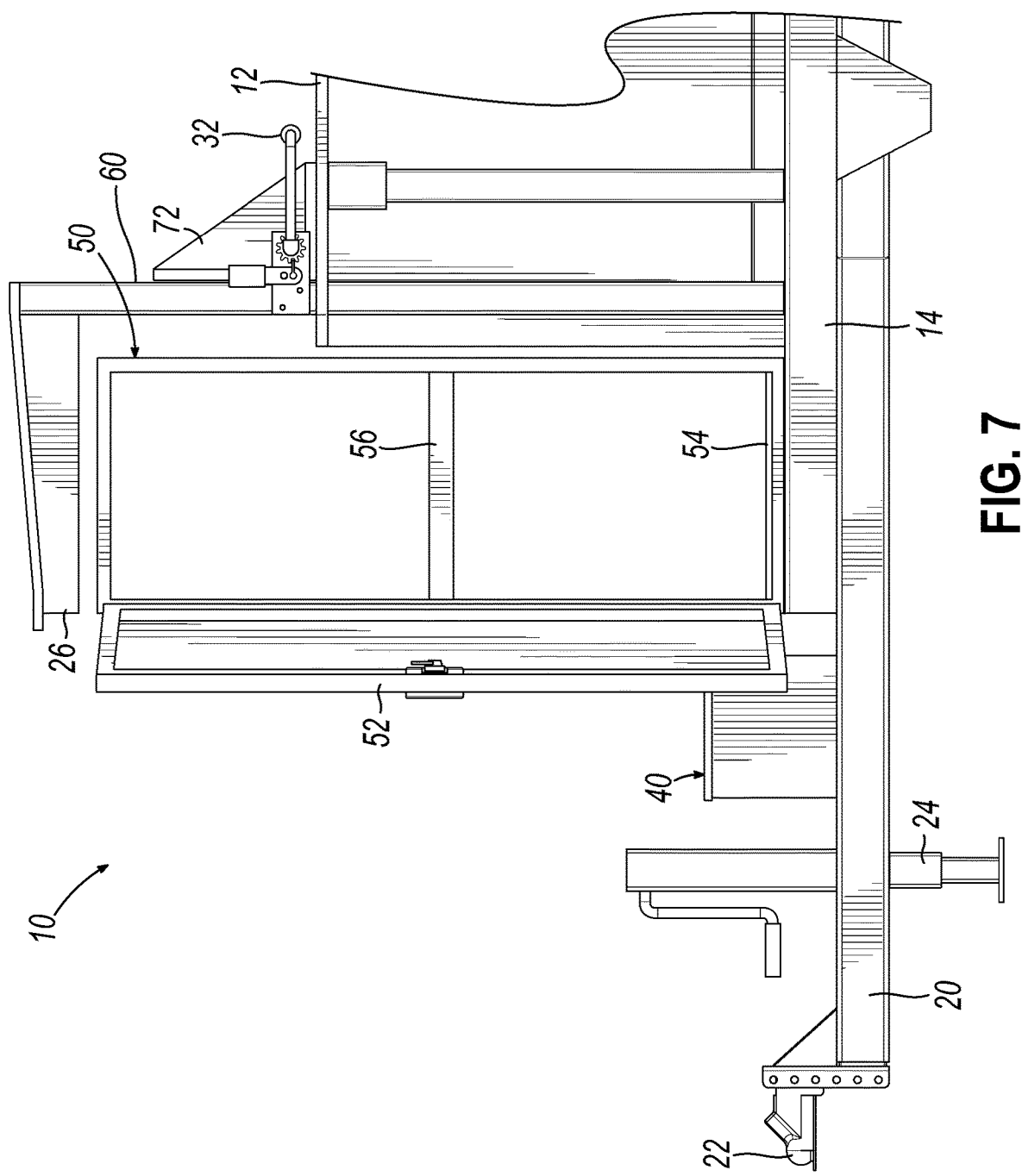
FIG. 7 is partial side elevation view of the dump trailer of FIG. 1 with the door of the storage unit open.

With continued reference to FIGS. 1 and 2, the dump trailer 10 further includes a storage unit 50 supported by the frame 14 and positioned underneath the raised platform 26 and in front of the front wall 60 of the dump box 12. The storage unit 50 has a door 52 on either side. The doors 52 may be lockable. The doors 52 extend from the bottom of the storage unit 50 to the top of the storage unit. Alternatively, the doors 52 may be divided such that there is an upper section and a lower section, and each section may be lockable and may be opened independently of each other. As shown in FIG. 7, the door 52 is open to show the interior of the storage unit 50, which includes a floor shelf 54 and at least one secondary shelf 56. Both the floor shelf 54 and the secondary shelf 56 may extend from one door 52 to the other and are considered passthrough shelves because an item placed on one of the shelves 54, 56 may be retrieved from either of the two doors 52. The secondary shelf 56 may be adjustable up or down to accommodate different size and shaped equipment. Additional shelves (i.e., two or more secondary shelves) may be used inside the storage unit 50 depending upon the user's storage needs. Vertical dividers (not shown) may also be used in addition to the secondary shelf 56 to create smaller compartments to aid in organizing the tools and equipment to be stored in the storage unit 50. The storage unit 50 may further include one or more hooks (not shown) mounted to the interior walls for hanging tools or equipment to aid in organizing the tools and equipment to be stored in the storage unit 50. The storage unit may also include one or more lights (not shown) to increase visibility in the storage unit 50, especially when it is dark outside. Alternatively, or in addition, a front wall 70 of the storage unit 50 may include one or more windows to allow natural light into the interior of the storage unit 50. The front wall 70 of the storage unit 50 may also include one or more access panels or doors to allow additional access to the interior of the storage unit 50. The doors 52 may be opened and the storage unit 50 accessed regardless of whether the dump box 12 is in a lowered position or in a raised position. Because the doors 52 may be lockable and the storage unit 50 may be accessed independent of the position of the dump box 12, the dump trailer 10 may securely store tools and equipment in the storage unit 50 regardless of whether the dump box 12 is full or empty. Such storage capabilities offer an advantage over conventional dump trailers which do not have any storage units configured to secured store tools or equipment.

The storage unit 50 has a height, a width, and a depth. The width refers to a dimension of the storage unit 50 extending in direction from side to side of the dump trailer 10. The depth refers to a dimension of the storage unit 50 extending in a direction from end to end of the dump trailer 10. In one embodiment, the storage unit 50 may have a height approximately 3-4 times greater than its depth. Thus, the door 52 would have a rectangular shape. In another embodiment, the storage unit 50 may have a height 2-3 times greater than its depth. In yet another embodiment, the storage unit may have a height approximately the same as the depth, whereby the door 52 is approximately square in shape.

The dump box 12 may further include wall extension holders 72 affixed to the sidewalls of the dump box 12. The wall extension holders 72 are configured to retain wall extension members (not shown) that are intended to increase the height of the sidewalls of the dump box 12. The wall extension members may be wood planks, such as dimensional lumber (2"×8", 2"×10", 2"×12", etc.), or metal slats that extended between two wall extension holders 72.

The dump trailer 10 shown in the FIGS. 1-7 is the style that couples to a ball hitch mounted on the bumper of a tow vehicle. A "goose-neck" style dump trailer is also contemplated by the invention. With a goose-neck style dump trailer incorporating the invention, the majority of the components would be like those shown in FIGS. 1-7, but the tongue 20 would be modified to a goose-neck style configuration such that the dump trailer couples to a fifth wheel or a ball hitch mounted in the bed of the tow vehicle. Thus, with the goose-neck style dump trailer, the dump trailer would have the storage unit 50 and the dump box 12 with the raised platform 26.

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A dump trailer comprising:
 a frame having a front end;
 a hitch operatively coupled to the frame, the hitch configured to be attached to a tow vehicle;
 a dump box supported by the frame, the dump box having a front wall, the dump box being moveable between a lowered position and a raised position; and
 a storage unit positioned on the front end of the frame and adjacent to the front wall when the dump box is in the lowered position, the storage unit having at least one door and an interior configured to store items placed therein;
 wherein the door is openable and the interior of the storage unit is accessible when the dump box is in either the lowered position or the raised position, and
 wherein a raised platform extends away from the front wall and over a top surface of the storage unit.

2. The dump trailer of claim 1, wherein the storage unit has two doors on opposing sides of the storage unit, each door being lockable.

3. The dump trailer of claim 1, wherein the storage unit includes a floor shelf.

4. The dump trailer of claim 3, wherein the storage unit includes a first secondary shelf positioned above the floor shelf, the secondary shelf being selectively moveable up or down in the interior of the storage unit.

5. The dump trailer of claim 4, wherein the storage unit includes a second secondary shelves.

6. The dump trailer of claim 1 further comprising the raised platform being operatively coupled to an upper end of the front wall of the dump box, the raised platform configured to support at least one item placed thereon.

7. The dump trailer of claim 1 further comprising a pump housing disposed between the hitch and the storage unit.

8. A dump trailer comprising:
 a frame having a front end;
 a hitch operatively coupled to the frame, the hitch configured to be attached to a tow vehicle;
 a dump box supported by the frame, the dump box having a front wall, the dump box being moveable between a lowered position and a raised position;
 a storage unit positioned on the front end of the frame and adjacent to the front wall when the dump box is in the lowered position, the storage unit having at least one door and an interior configured to store items placed therein and a first secondary shelf located in the interior of the storage unit; and
 a raised platform operatively coupled to an upper end of the front wall of the dump box, the raised platform extending away from the front wall and over a top surface of the storage unit, the raised platform configured to support at least one item placed thereon;
 wherein the door is openable and the interior of the storage unit is accessible when the dump box is in either the lowered position or the raised position.

9. The dump trailer of claim 8, wherein the storage unit has two doors on opposing sides of the storage unit, each door being lockable.

10. The dump trailer of claim 8, wherein the storage unit includes a floor shelf.

11. The dump trailer of claim 10, wherein the first secondary shelf is positioned above the floor shelf, the secondary shelf being selectively moveable up or down in the interior of the storage unit.

12. The dump trailer of claim 11, wherein the storage unit includes a second secondary shelf.

13. The dump trailer of claim 8 further comprising a pump housing disposed between the hitch and the storage unit.

* * * * *